United States Patent [19]

Swanberg et al.

[11] Patent Number: 5,778,443
[45] Date of Patent: Jul. 7, 1998

[54] METHOD AND APPARATUS FOR CONSERVING POWER AND SYSTEM RESOURCES IN A COMPUTER SYSTEM EMPLOYING A VIRTUAL MEMORY

[75] Inventors: Randal Craig Swanberg, Round Rock; Michael Stephen Williams, Austin, both of Tex.

[73] Assignee: International Business Machines Corp., Armonk, N.Y.

[21] Appl. No.: 355,881

[22] Filed: Dec. 14, 1994

[51] Int. Cl.$^6$ .............................. G06F 12/16; G06F 1/32
[52] U.S. Cl. .................. 711/162; 711/161; 395/182.13; 395/182.14; 395/750; 365/227; 364/707
[58] Field of Search .................. 395/182.13, 182.14, 395/750; 711/161, 162; 365/227; 364/707

[56] References Cited

U.S. PATENT DOCUMENTS

| | | | |
|---|---|---|---|
| 4,685,125 | 8/1987 | Zave | 379/96 |
| 4,742,447 | 5/1988 | Duvall et al. | 395/375 |
| 4,819,156 | 4/1989 | DeLorme et al. | 395/182.13 |
| 5,012,407 | 4/1991 | Finn | 395/700 |
| 5,041,964 | 8/1991 | Cole et al. | 395/750 |
| 5,241,669 | 8/1993 | Cohn et al. | 395/180 |
| 5,327,551 | 7/1994 | Kaneko | 395/182.03 |
| 5,339,406 | 8/1994 | Carney et al. | 395/183.21 |
| 5,386,552 | 1/1995 | Garney | 395/182.08 |
| 5,388,242 | 2/1995 | Jewett | 395/440 |
| 5,390,334 | 2/1995 | Harrison | 395/750 |
| 5,394,537 | 2/1995 | Courts et al. | 395/412 |
| 5,435,004 | 7/1995 | Cox et al. | 395/621 |
| 5,446,904 | 8/1995 | Belt et al. | 395/750 |
| 5,551,043 | 8/1996 | Crump et al. | 395/750 |

*Primary Examiner*—Eddie P. Chan
*Assistant Examiner*—Hong C. Kim
*Attorney, Agent, or Firm*—Anthony V. S. England; Thomas G. Devine

[57] ABSTRACT

A computer system has volatile random access memory ("RAM") and nonvolatile auxiliary storage, a virtual memory operating system with some pages of virtual memory resident in RAM and other pages resident in a paging space in auxiliary storage. A time varying operating state for the computer is definable by reference to contents of the memory. A space in auxiliary storage (a "hibernation space") is allocated for storing a portion of RAM as a hibernation image. A first group of the RAM-resident virtual memory pages is stored in the paging space. A second group of the RAM-resident virtual memory pages is stored in the hibernation space. A hibernation state is entered where the computer system is powered off with the system at a certain operating state. The computer system is returned to operation at the certain operating state, which includes powering on the computer system and reading the second group of pages into the RAM.

8 Claims, 5 Drawing Sheets

METHOD AND APPARATUS FOR CONSERVING POWER AND SYSTEM RESOURCES IN A COMPUTER SYSTEM EMPLOYING A VIRTUAL MEMORY

BACKGROUND OF THE INVENTION

1. Field of the Invention

The present invention relates to storage of the operational state of a computer system, and more particularly to a method, memory and apparatus for storing the operational state of a computer system which reduces required storage space and improves the speed of resuming from a hibernation state.

2. Background Information and Description of the Related Art

In a computer system a processor may directly access information in its random access memory ("RAM"). Information in auxiliary storage, such as a disk drive, must be loaded into RAM in order for the processor to act on it. In a computer system having a virtual memory operating system, a virtual memory space is defined which the processor may address as if the information in virtual memory were in physical memory (RAM). The virtual memory space is divided into segments referred to as pages. Likewise, RAM is divided into page frames and auxiliary storage is divided into blocks which correspond in size to the virtual memory pages. A mapping mechanism in the computer keeps track of whether pages of virtual memory are resident in RAM or in auxiliary storage. If the processor requires a page of virtual memory that is not in physical memory, then a paging mechanism causes the page to be read into physical memory, and, if necessary, causes an existing page of physical memory to be swapped out to make room for the newly required page. Thus, in a computer system having 32 MBytes of RAM, for example, there may be 64 MBytes of auxiliary storage blocks ("paging space") reserved exclusively for virtual memory paging.

Computer systems having a power management system for conserving power consumption typically include a hibernation feature for powering off the system when the system is idle or inactive. This hibernation may be initiated, for example, on a command by the user or in response to a time out which occurs upon a certain period of non-use. In order to resume operation after hibernation without interrupting operations that were in progress prior to hibernation, the operating state of the computer system must be saved prior to powering off and must be restored after powering on. The operating state of a computer system may is generally be defined by the contents of memory. Since RAM is volatile, meaning that the contents of RAM will be lost upon loss of power, saving the operating state of a computer system for hibernation typically requires writing hibernation image of the entire contents of RAM to auxiliary (nonvolatile) storage, such as to a certain disk drive at a location that is dedicated exclusively to storage of the hibernation image. For example, a computer system having 32 MBytes of RAM will ordinarily have 32 MBytes of auxiliary storage dedicated for hibernation storage. Restoring the operational state after hibernation then requires loading the entire hibernation image back into RAM.

In a typical virtual memory system, although the operating system is not ordinarily used to preserve pages of virtual memory for use after the system has been powered off, nevertheless the pages still reside in auxiliary storage after powering back on. Accordingly, it is an object of the present invention to advantageously use the management of virtual memory provided by the operating system (OS) to assist in enabling hibernation.

It is a further objective of the present invention to reduce the amount of information that must be written to physical memory upon initiating hibernation, thereby increasing the speed of resuming normal operation from a hibernation state and reducing the required storage space that must be dedicated exclusively for storing the hibernation image.

SUMMARY

The computer system in the present invention has volatile random access memory ("RAM") and nonvolatile auxiliary storage, a virtual memory operating system with some pages of virtual memory resident in RAM and other pages resident in a paging space in auxiliary storage. A time varying operating state for the computer is definable by reference to contents of the memory. A space in auxiliary storage ("a hibernation space") is allocated for storing a portion of RAM as a hibernation image. A first group of the RAM-resident virtual memory pages is stored in the paging space. A second group of the RAM-resident virtual memory pages is stored in the hibernation space. A hibernation state is entered where the computer system is powered off with the system at a certain operating state. The computer system is returned to operation at the certain operating state, which includes powering on the computer system and reading the second group of pages into the RAM.

In a further aspect of the invention, the first and second groups of pages are identified by testing the RAM-resident virtual memory pages and are categorized into pageable and nonpageable pages.

In a still further aspect, a certain portion of memory is allocated as a bit map. The bit map has bits corresponding to RAM pages for identifying a pageable and nonpageable status for the RAM-resident pages. The hit map represents The pages in RAM that are pinned or have no page space allocated.

In another aspect, the inventions includes a computer readable media embodying computer readable program code for use in a computer system such as the system herein described. The program code functions to direct the computer to perform the steps for saving the system RAM in the paging and hibernation spaces, entering the hibernation state, returning from hibernation, and restoring the portion of RAM saved in the hibernation space so that operation may resume in the original operating state.

Still other objects and advantages of the present invention will become readily apparent to those skilled in this art from the following detailed description. The preferred embodiment of the invention is shown by way of illustration of the best mode contemplated for carrying out the invention. Other embodiments are possible and the details may be modified in various respects without departing from the invention. Accordingly, the drawing and description are to be regarded as illustrative in nature, and not restrictive.

DETAILED DESCRIPTION OF THE PREFERRED EMBODIMENT

Figure 1:
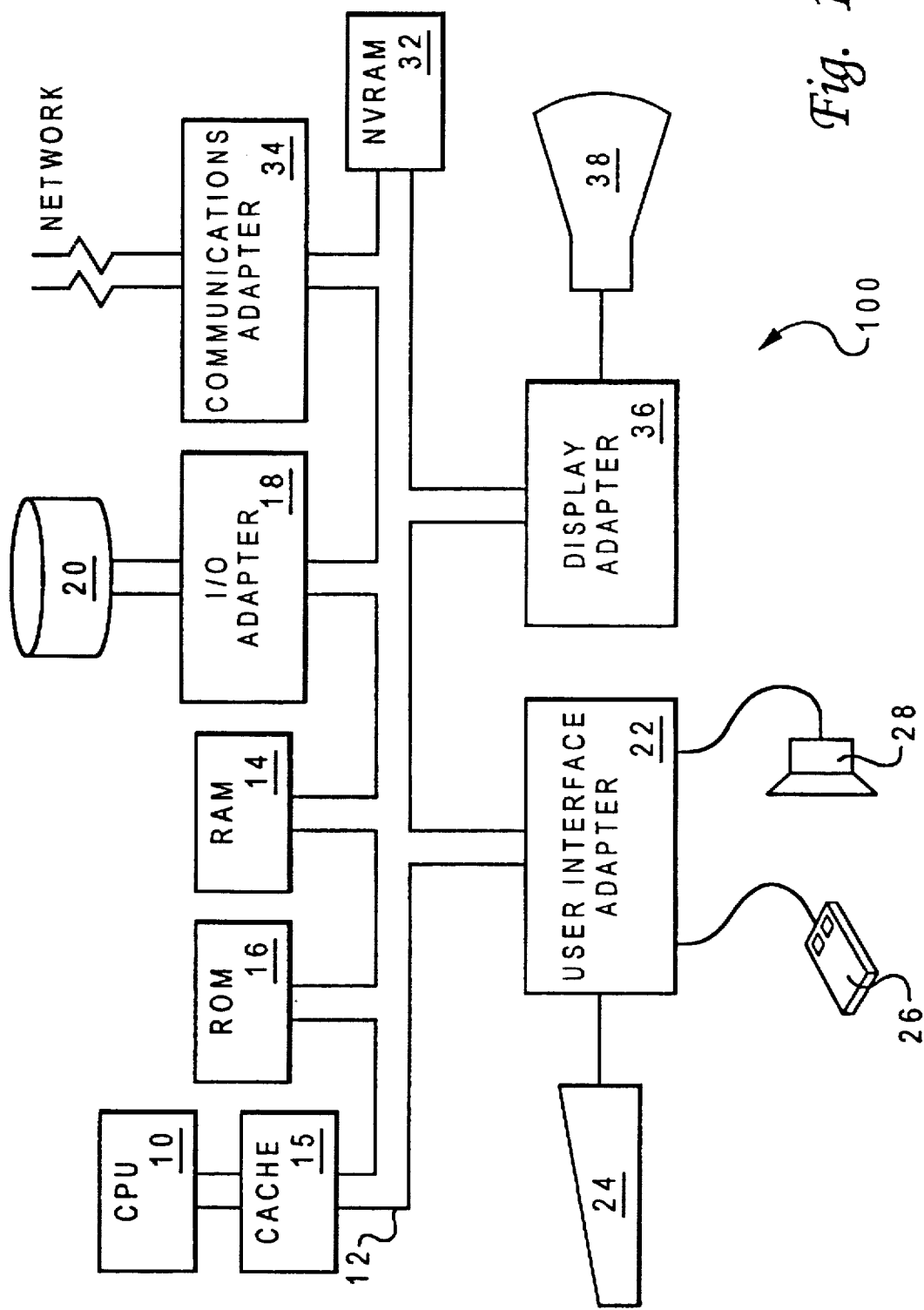
FIG. 1 illustrates a suitable representative computer system for the present invention.

The preferred embodiment is practiced in any suitable hardware configuration, such as a laptop computer or, alternatively, in the hardware configuration shown in FIG. 1. Computer system 100 includes any suitable central processing unit 10, such as an IBM a PowerPC™ 601, and a number of other units interconnected via system bus 12. Illustratively, computer system 100 includes random access memory (RAM) 14, cache 15, read only memory (ROM) 16, nonvolatile random access memory (NVRAM) 32, display adapter 36 for connecting system bus 12 to display device 38, and I/O adapter 18 for connecting peripheral devices, such as disk drives 20 to system bus 12.

Computer system 100 further includes user interface adapter 22 for connecting user controls (e.g., keyboard 24, mouse 26, speaker 28, and/or other user interface devices, such as a touch screen device) to system bus 12. Communication adapter 34 connects computer system 100 to a data processing network. Any suitable operating system (OS) may direct the operation of computer system 100, such as Apple's Macintosh™ System 7 OS, IBM's OS/2™ or Microsoft's Windows NT™. However, in the preferred embodiment, IBM's AIX™ operating system controls computer system 100.

ROM 16 includes conventional system firmware for initializing and testing the computer system when powered "on" or "reset". This firmware further includes detailed logic for loading or bootstrapping the operating system and other software programs.

Figure 2:
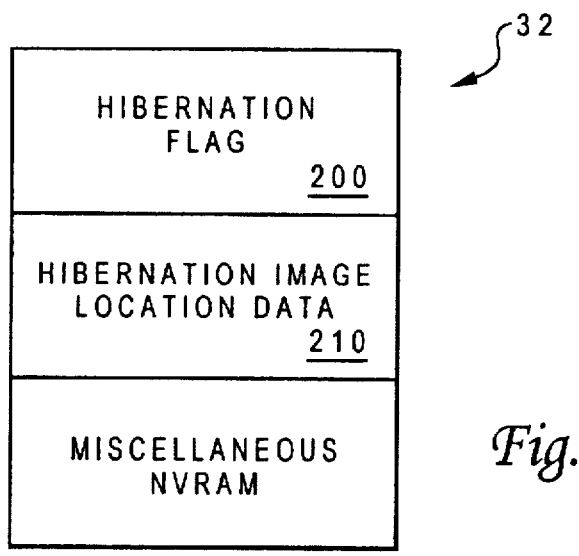
FIG. 2 is a block diagram of a nonvolatile storage device for the present invention.

FIG. 2 is a block diagram illustrating the relevant portions of information stored in NVRAM or nonvolatile auxiliary storage 32. Specifically, NVRAM or auxiliary storage 32 includes hibernation flag 200 and hibernation image location data 210. When set, hibernation flag 200 indicates that the system is in a hibernation state. Conversely, when clear, hibernation flag 200 indicates that the system is not in a hibernation state. Hibernation image location data 210 includes a value specifying a particular disk unit, a starting address within that particular disk unit, and a length value. This data identifies a specific address in a specific disk for storing a specific amount of information from RAM 14. The OS determines and stores this information in NVRAM or auxiliary storage 32 when the system enters hibernation and after it creates a compressed RAM image (described herein).

Figure 3:
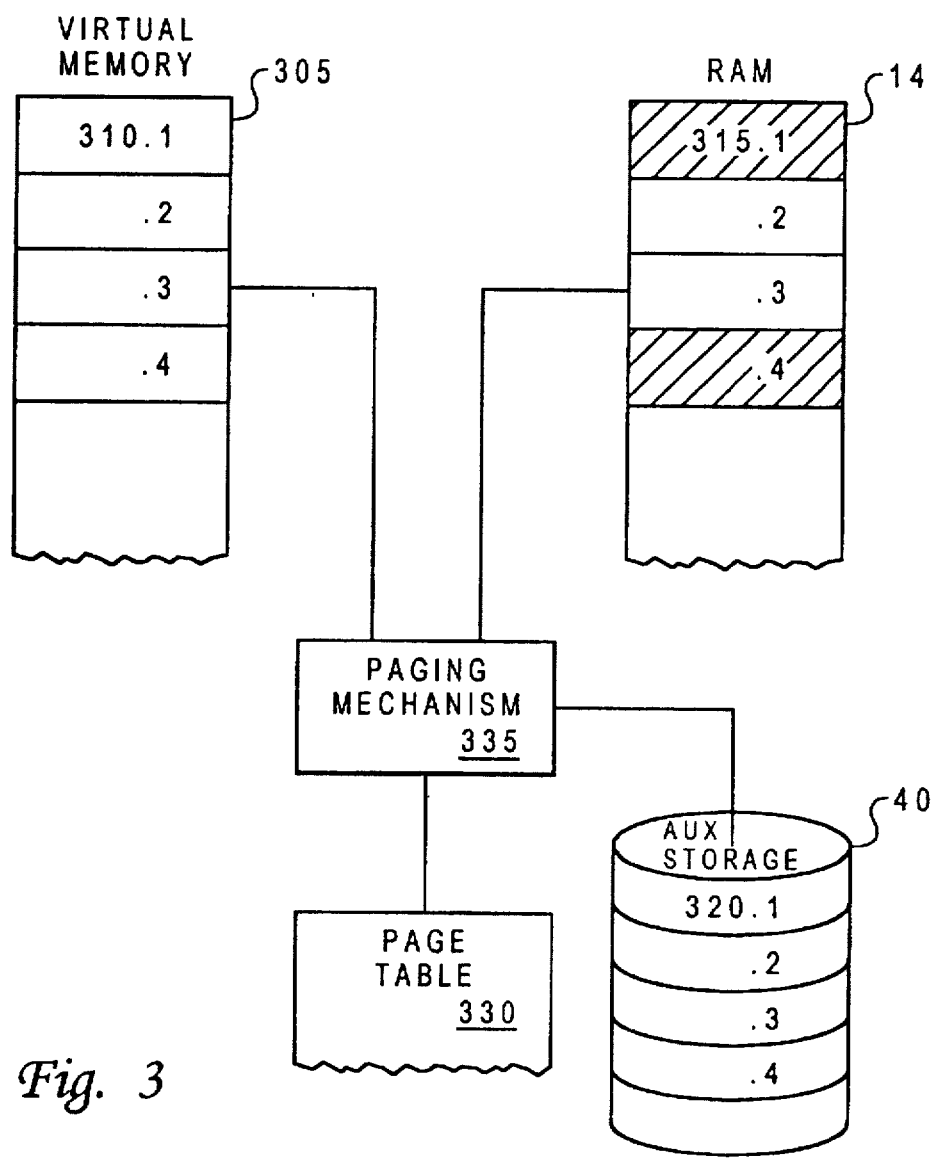
FIG. 3 is a diagram of the virtual memory system of the present invention.

As illustrated in FIG. 3, the computer system 100 has a virtual memory operating system according to which a virtual memory space 305 is defined which the processor 10 (not shown) may address as if the information in virtual memory 305 were in physical memory (RAM) 14. The virtual memory space 305 is divided into segments 310 referred to as pages (e.g., pages 310.1, 310.2, etc.). Likewise, RAM 14 is divided into page frames 315 and auxiliary storage 40 is divided into blocks 320 which correspond in size to the virtual memory pages 310. Auxiliary storage 40 as shown in FIG. 3 may include storage such as disk storage 20 or NVRAM 32 shown in FIG. 1.

The pages 310 of virtual memory 305 actually reside either in physical memory 14 or in auxiliary storage 40. Therefore, the operating system keeps one or more page table 330 to indicate whether a page 310 of virtual memory 305 is resident in RAM 14 or in auxiliary storage 40. If the processor 10 requires a page 310 of virtual memory 305 that is not in physical memory 14, then the paging mechanism 335 causes the required page 310 to be read into physical memory 14, and, if necessary, causes an existing page 310 of virtual memory 305 resident in physical memory 14 to be moved to auxiliary storage 40 ("paged out") to make room for the newly required page 310. Some of the blocks 320 of auxiliary storage 40 are dedicated exclusively for storing the virtual memory pages 310 not resident in RAM 14.

Certain pages 315 of RAM 14 are "pageable" pages, such as pages 315.2 and 315.3, which may be moved in and out of RAM 14. Other pages 315, such as pages 315.1 and 315.4, are "pinned" pages which are not pageable, but rather are required to remain resident in RAM. Pinned pages are indicated in FIG. 3 by shading. Pages 315 may be temporarily pinned, for example, such as by an input/output operation calling a function which causes a page 315 to be pinned until the operation is finished so that the page 315 can be kept current. Other pages 315 of RAM 14 may be pinned more or less permanently, in connection with an essentially permanent device driver.

A page 315 of RAM 14 which is not pinned must have auxiliary storage 40 allocated for storing the page 315 ("backing store") in case the page 315 is removed from RAM 14. This backing store is typically allocated by the user in configuring the computer system. Pinned pages 315 may or may not have backing store.

The computer system 100 has a power management system with a hibernation feature. Hibernation may be initiated on a command by the user or in response to a certain period of non-use. A portion of auxiliary storage 40 is allocated exclusively for storing information from RAM 14 (the hibernation image) required to identify the operational state of the computer system 100.

Figure 4:
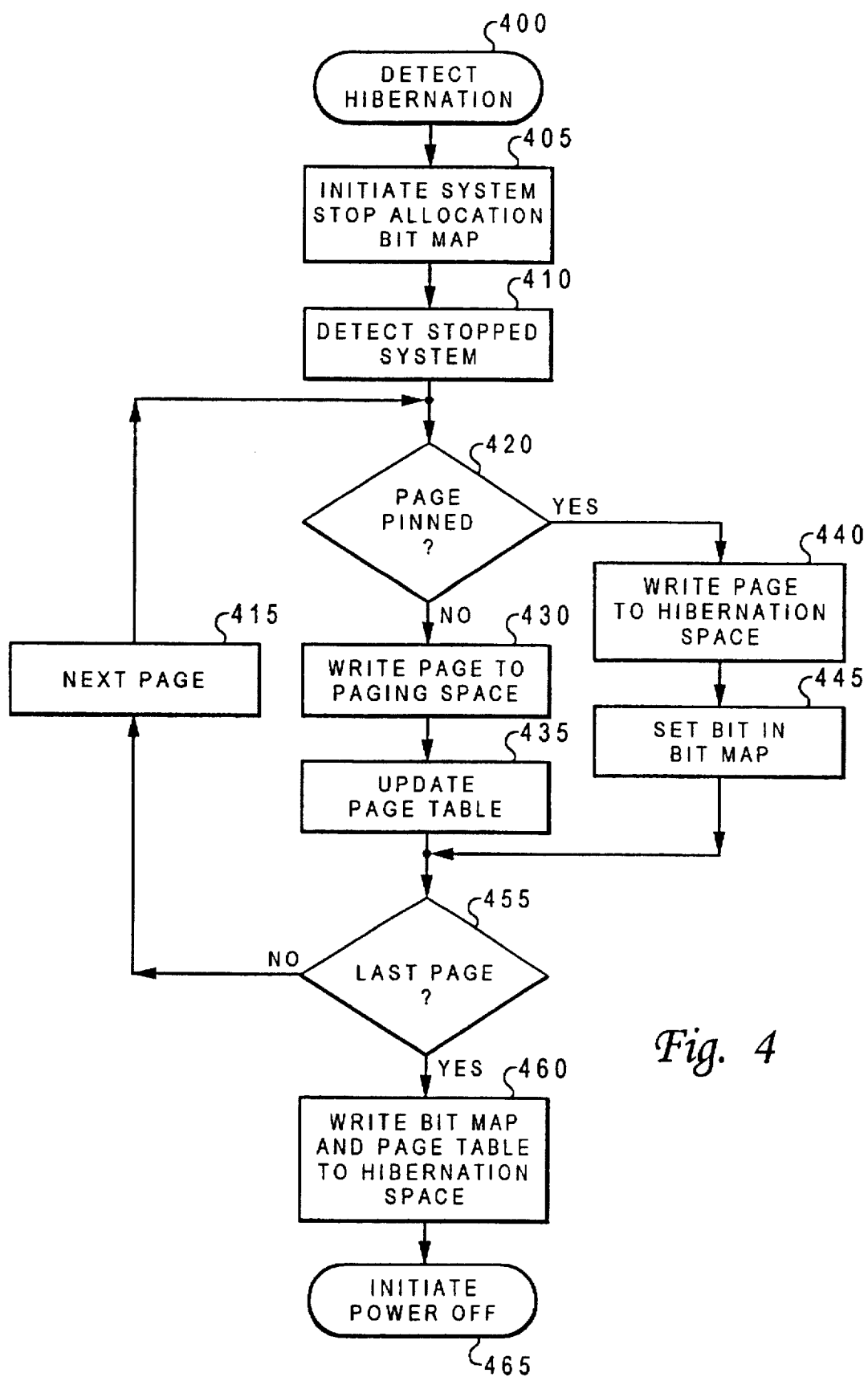
FIG. 4 is a flow diagram for entering hibernation according to the present invention.

FIG. 4 illustrates a flow diagram for entering hibernation. To prepare for power off when hibernation is initiated, at 400 the OS detects a request to enter hibernation. The request to enter hibernation can be initiated by the user through user controls. Alternatively, the hibernation request can be initiated by the OS when the computer system has been idle for a certain amount of time and/or when the OS detects a low battery condition.

At 405, a hibernation process initiates operations required to stop all system activity so that a consistent system image can be hibernated. Typically, stopping system activity includes preventing additional I/O requests and waiting for the completion of any I/O requests currently in progress. Also at 405, the process establishes a portion of memory 14 as a bit map. Each bit in the bit map corresponds to a page of RAM where the first bit corresponds to the first page, the second bit corresponds to the second page, and so on. A bit is set to a 1 or 0 to indicate whether a page of RAM at the time of hibernation is pinned or pageable.

At 410 the process receives an indication that the system has quiesced so that hibernation can proceed. At 420 the hibernation process consults the virtual memory page table to identify a page resident in RAM that is pinned. At 430, for a page that is not pinned, the process writes the pageable page of RAM to the paging space in auxiliary storage. At 435 the process updates the page table to indicate the location of the page moved from RAM. At 440, for a page that is pinned, the process writes the pinned page to the hibernation space in auxiliary storage. At 445 the process sets the bit in the bit nap corresponding to the pinned page, thereby indicating that the page is pinned and has been written to the hibernation space.

At 455 the process determines whether the page just processed is the last page of RAM, and if it is not the last page the processor returns to 415 to identify the next page. If the process has processed the last page, at 460 it writes the bit map and the page table to the hibernation space. At 465 the process initiates power off.

Figure 5:
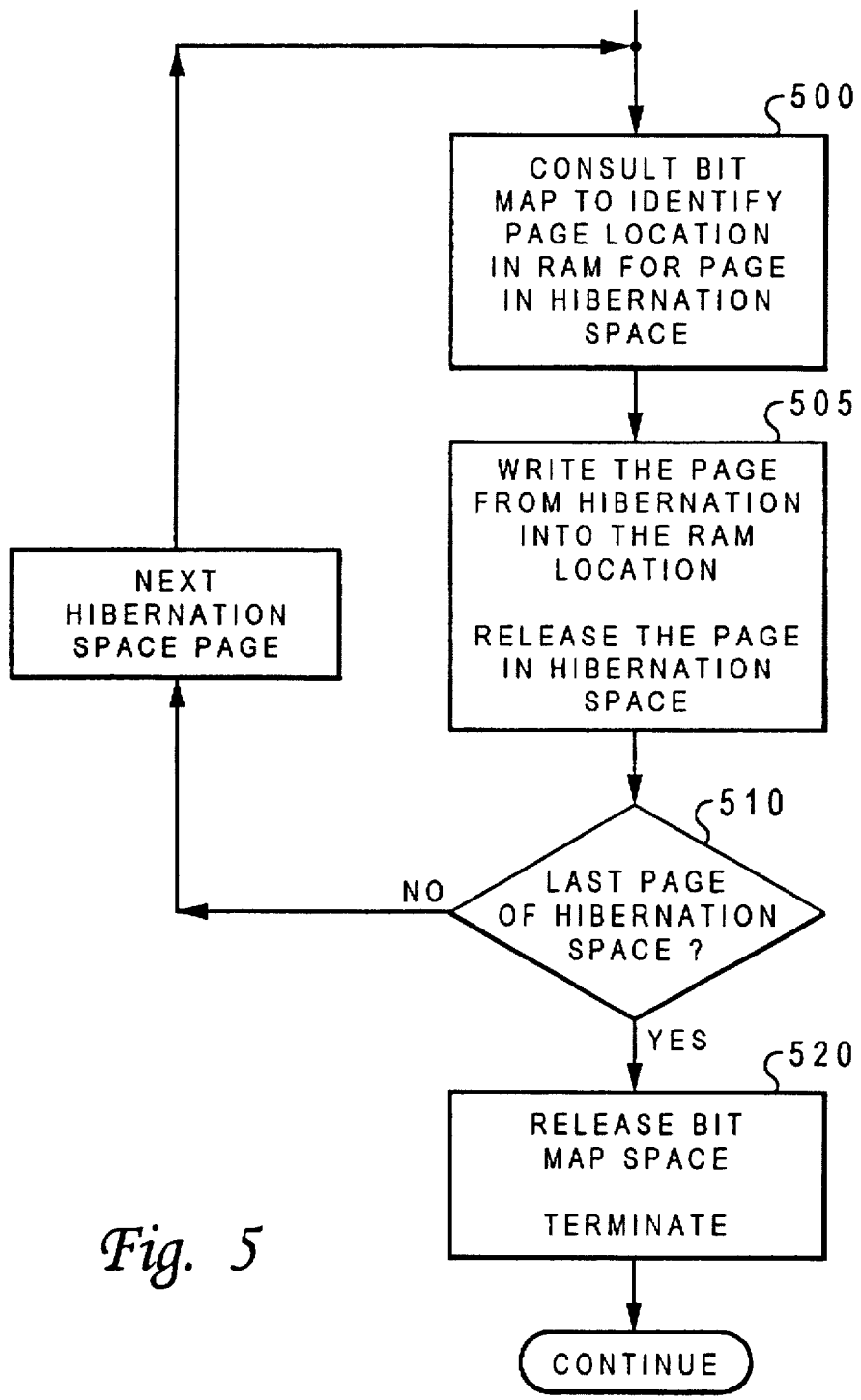
FIG. 5 is a flow diagram for returning from hibernation in the present invention.

FIG. 5 illustrates a flow diagram for returning from hibernation. After power on, the process refers (at 500) to the bit map and identifies a page of RAM that is stored in the hibernation space. At 505 the process writes the page to RAM at the correct location and releases the hibernation space for that page. At 510 the process determines whether the page just processed is the last page in the hibernation space. If the page is not the last page, then the processor returns to 500 to identify the next page in the hibernation space. If the page is the last page, then at 520 the process releases the space allocated to the bit map and terminates.

Thus, immediately after returning from hibernation pageable virtual memory that was moved from RAM to the virtual memory space of auxiliary storage prior to powering off still resides in the virtual memory space of auxiliary storage and may still be accessed according to the virtual memory page table, but only the pinned virtual memory now resides in RAM. Then, if pageable virtual memory is required by the processor, a page fault will occur and the required page will be faulted back into RAM by a virtual memory page fault mechanism which does not have to be any different than a page fault mechanism in a system without provision for a hibernation state.

Figure 6:
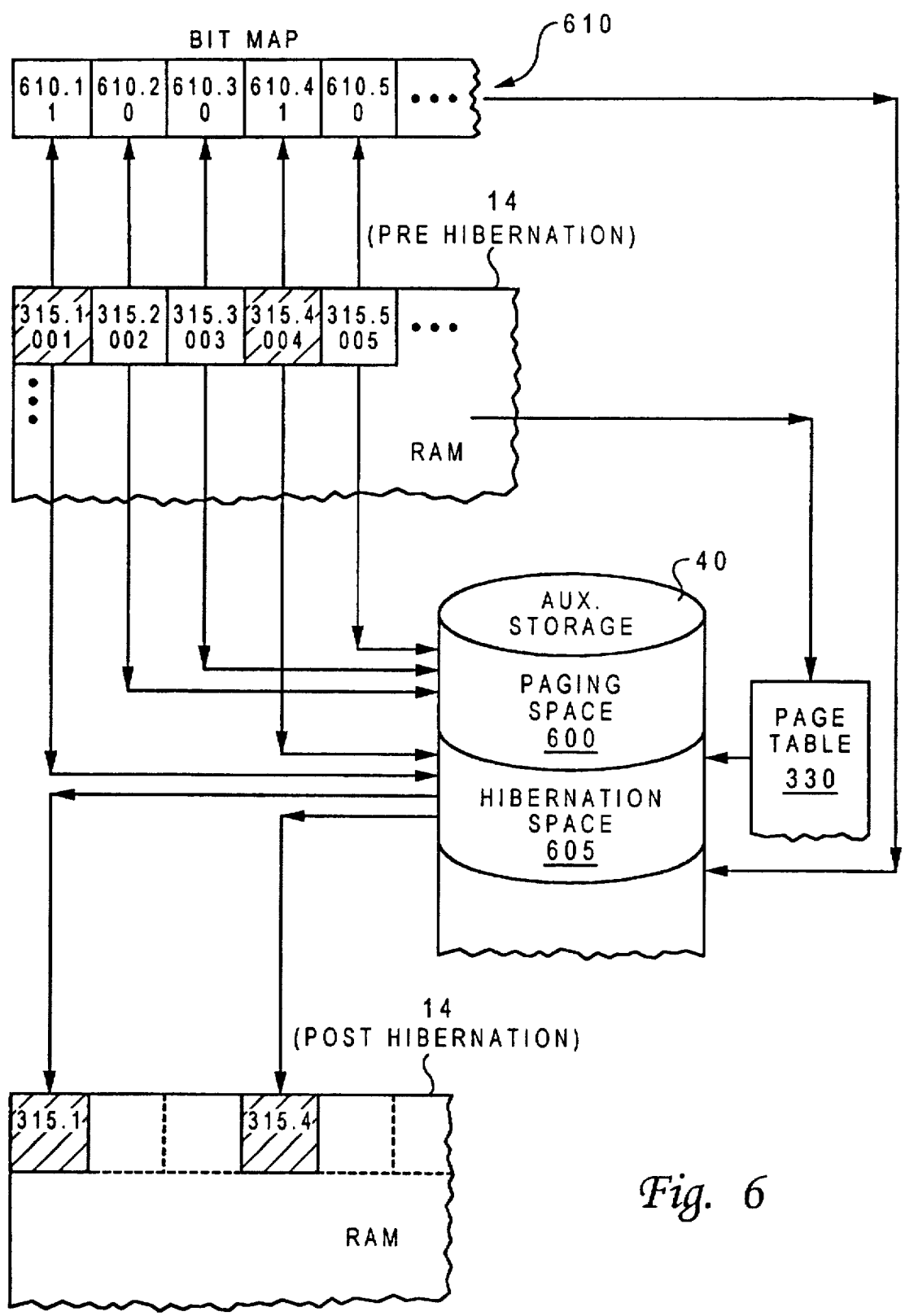
FIG. 6 is a diagram illustrating saving pages of RAM to the paging and hibernation spaces and restoring pages from the hibernation space to RAM.

FIG. 6 illustrates saving pages 315 of RAM 14 to the paging and hibernation spaces 600 and 605 in auxiliary storage 40 and restoring pages from the hibernation space 605 to RAM 14. The pageable pages 315 of RAM 14 are stored in the paging space of 600 of the auxiliary storage 40. The pinned pages 315 of RAM 14 (shown as shaded) are stored in the hibernation space 605. The bit map 610 has bits 610.1, 610.2, etc. corresponding to the RAM 14 pages 315.1, 315.2, etc. for identifying the pageable and pinned status for the RAM 14 pages 315. Bits 610.1, etc. in the bit map 610 are set to identify RAM 14 location and the pageable and nonpageable status of RAM 14. For pages 315 having paging space 600 allocated, their page table 330 is updated to indicate where the pages 315 are stored. Finally, the bit map 600 and page table 330 is stored in hibernation space 605.

A hibernation state is then entered where the computer system 100 is powered off. The certain operating state of the system 100 at the time of hibernation is thus defined by the information now stored in the paging and hibernation spaces 600 and 605.

Returning from hibernation, the computer system 100 is returned to the certain operating state. This includes powering on the computer system 100 and reading the group of pages from the hibernation space 605 into the post-hibernation RAM 14. The bit map 610 is used to read the pages stored in the hibernation space 605 into the identified RAM 14 locations such as pages 315.1 and 315.4.

What is claimed is:

1. A method for conserving power consumption in a computer system having volatile random access memory ("RAM") and nonvolatile auxiliary storage, a virtual memory operating system with some pages of virtual memory resident in RAM and other pages resident in a paging space in auxiliary storage, and further having a time varying operating state definable by reference to the memory, comprising the steps of:
   (a) allocating a space in auxiliary storage (a "hibernation space") for storing a portion of RAM as a hibernation image;
   (b) storing a first group of the RAM pages in the paging space;
   (c) storing a second group of the RAM pages in the hibernation space;
   (d) entering a hibernation state, including powering off the computer system with the computer at a certain operating state; and
   (e) returning from the hibernation state, including:
      (i) powering on the computer system;
      (ii) reading the second group of pages into the RAM; and
      (iii) resuming the computer system operation at the certain operating state.

2. The method of claim 1, further comprising the step of:
   (f) categorizing the RAM pages into the first and second groups according to a pageable and nonpageable status.

3. The method of claim 2, further comprising the steps of:
   (g) allocating the certain portion of memory as a bit map for identifying the pageable and nonpageable status of the RAM pages, the bit map having bits corresponding to the RAM pages; and
   (h) setting bits in the bit map to identify RAM location and the pageable and nonpageable status of the RAM pages;
   wherein, step (e) further comprises using the bit map to read the pages stored in the hibernation space into the identified RAM locations.

4. An apparatus for conserving power consumption in a computer system having volatile random access memory ("RAM") and nonvolatile auxiliary storage, a virtual memory operating system with some pages of virtual memory resident in RAM and other pages resident in a paging space in auxiliary storage, and further having a time varying operating state definable by reference to the memory, comprising:
   (a) means for categorizing RAM pages into a first group of pageable pages and a second group of nonpageable pages;
   (b) a hibernation space in auxiliary storage for storing the second group of pages;
   (c) means for storing the first group of pages in the paging space and the second group of pages in the hibernation space upon receiving a request to enter a hibernation state; and
   (d) means for restoring the second group of pages to RAM upon returning from hibernation.

5. The apparatus of claim 4, further comprising:
   (e) a portion of memory allocated as a bit map for identifying the pageable and nonpageable status of the RAM pages, the bit map having bits corresponding to the RAM pages;
   (f) means for setting bits in the bit map to identify RAM location and pageable and nonpageable status of the RAM pages; and
   (g) means for using the bit map to read the pages stored in the hibernation space into the identified RAM locations.

6. A computer readable media embodying computer readable program code for use in a computer system having volatile random access memory ("RAM") and nonvolatile auxiliary storage, a virtual memory operating system with some pages of virtual memory resident in RAM and other pages resident in a paging space in auxiliary storage, and further having a time varying operating state definable by reference to contents of the memory, to direct the computer system to perform steps comprising:

(a) allocating a space in auxiliary storage (a "hibernation space") for storing a portion of RAM as a hibernation image;

(b) storing a first group of the RAM pages in the paging space; and (c) storing a second group of the RAM pages in the hibernation space;

(d) entering a hibernation state, including powering off the computer system with the computer at a certain operating state; and (e) returning from the hibernation state, including:
 (i) powering on the computer system;
 (ii) reading the second group of pages into the RAM; and
 (iii) resuming the computer system operation at the certain operating state.

7. The computer readable media embodying computer readable program code of claim 6, to direct the computer to perform the further step:

(f) categorizing the RAM pages into the first and second groups according to a pageable and nonpageable status.

8. The computer readable media embodying computer readable program code of claim 7 to direct the computer system to perform further steps comprising:

(g) allocating the certain portion of memory as a bit map for identifying the pageable and nonpageable status of the RAM pages, the bit map having bits corresponding to the RAM pages; and (h) setting bits in the bit map to identify RAM location and the pageable and nonpageable status of the RAM pages;

wherein, step (e) further comprises using the bit map to read the pages stored in the hibernation space into the identified RAM locations.

* * * * *